Aug. 1, 1939.      R. H. MITCHELL      2,167,768
DISK HARROW
Filed Nov. 24, 1937      2 Sheets-Sheet 1
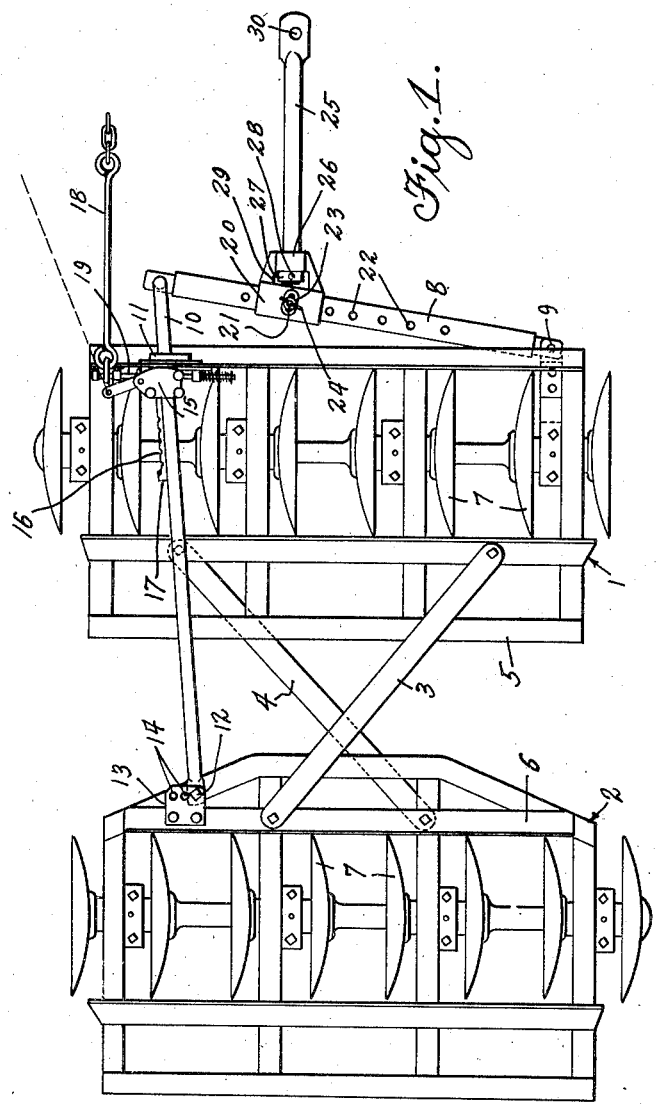
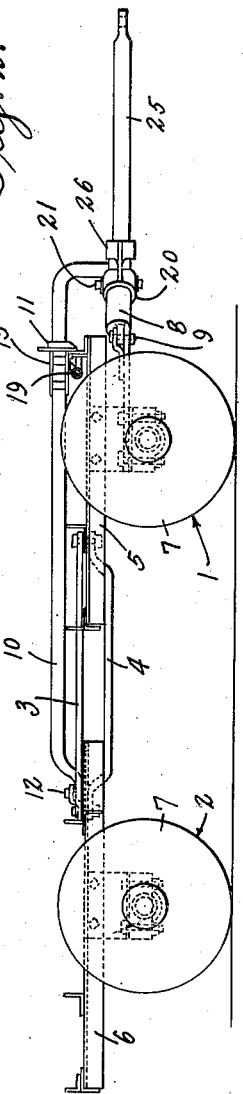
Inventor
Rollie H. Mitchell
By Lyon & Lyon
Attorneys Patented Aug. 1, 1939

2,167,768

UNITED STATES PATENT OFFICE 2,167,768

DISK HARROW

Rollie H. Mitchell, Huntington Park, Calif., assignor to Killefer Manufacturing Corporation, Los Angeles, Calif., a corporation of California Application November 24, 1937, Serial No. 176,237

11 Claims. (Cl. 55—83)

This invention relates to disk harrows, and more particularly to disk harrows of the single tandem offset type, and is particularly related to the hitch mechanism for such a harrow.

In the operation of a single tandem offset disk harrow it has been found advantageous to close-couple the harrow to the tractor. Such close-coupling of the harrow to the tractor is limited by the structural characteristics of the hitch and from the fact that it is desirable, as is true in all types of harrows, to so connect the tractor with the disk harrow that the motive power of the tractor may be utilized for moving the disk gangs to their required or desired angular relation.

In a single offset disk harrow this problem of close-coupling the harrow to the tractor has heretofore been accentuated by the necessity of providing an adjustable hitch adjustable to permit the disk harrow to be used at different degrees or positions of offset with relation to the tractor.

It is therefore an object of this invention to provide a hitch mechanism which will permit the harrow to be close-coupled to the tractor and which will likewise permit the motive power of the tractor to be utilized to move the disk gangs to their desired or required angular position and which likewise provides for the required adjustment for the positioning of the disk harrow in the desired offset relation to the tractor.

Another object of this invention is to provide a hitch structure for an offset disk harrow whereby the disk harrow may be connected with the tractor and which hitch structure is of simple and inexpensive construction and may be easily adjusted to meet all conditions of operation.

Other objects and advantages of this invention it is believed will be apparent from the following detailed description of a preferred embodiment thereof as illustrated in the accompanying drawings.

In the drawings:

Figure 1 is a top plan view of a disk harrow embodying my invention.

Figure 2 is a side elevation thereof.

Figure 3:
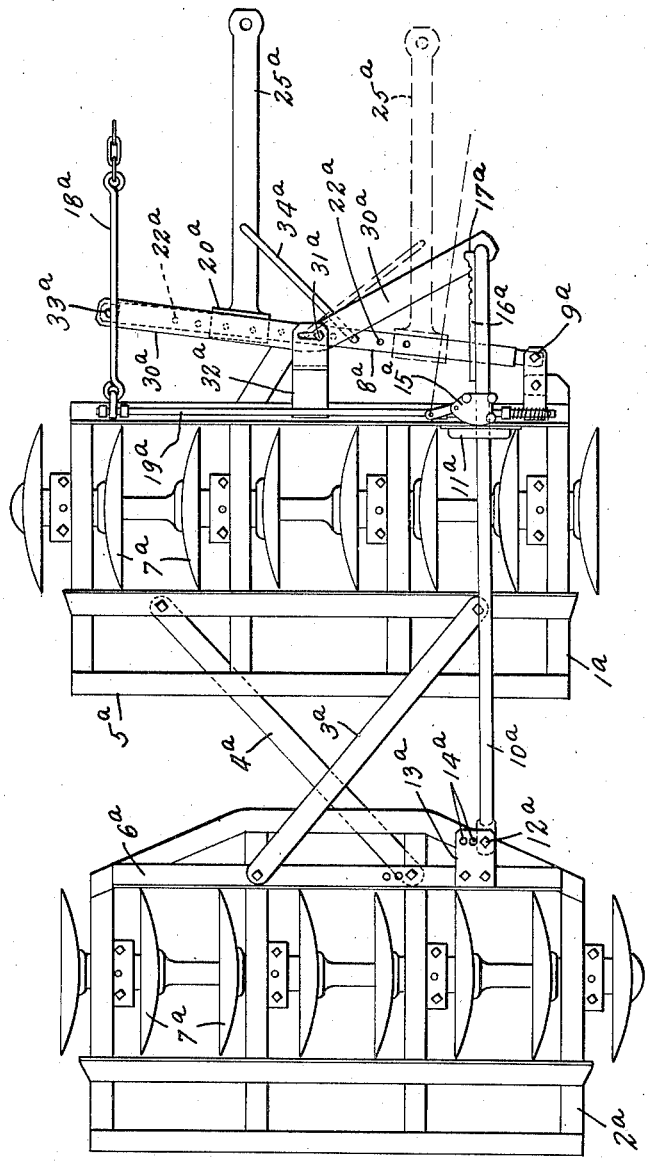
Figure 3 is a top plan view of a modified form of disk harrow embodying my invention.

In the form of my invention as illustrated in Figures 1 and 2, 1 indicates a front gang of disks and 2 a rear gang of disks. The gangs of disks 1 and 2 are pivotally connected together by a pivot means herein illustrated as including the crossbars 3 and 4, which are respectively pivotally connected to the frames 5 and 6 of the front and rear gangs of disks. Each gang of disks includes a plurality of concavo convex disks 7 held in spaced relation and rotatively supported by the respective frames in any suitable or desirable manner. The disks 7 of the front gang are turned with their concave sides toward the right side of the harrow, while the disks 7 of the rear gang are turned with their concave sides in the opposite direction.

The improved form of hitch embodying my invention is in this modification illustrated as including a tubular bar 8 which is pivotally connected at a pivot 9 to the right side end of the frame 5 of the front gang of disks 1. The hitch bar 8 at its opposite end is pivotally connected to the pull bar 10. The pull bar 10 extends through a guide 11 mounted upon the frame 5 to the rear gang and at its rear end is connected by a pivot pin 12 to a plate 13 secured to the frame 6 of the rear gang 2. The pull bar 10 may be connected by the pivot pin 12 in a plurality of adjusted positions to plate 13, as indicated by the holes 14.

A latch means indicated at 15 is mounted upon the pull bar 10 to releasably latch the pull bar 10 with relation to the guide 11 to determine the degree of angularity of the disk gangs under operation. Mounted upon the pull bar 10 is the angular selector rack 16 which operates in conjunction with the latch 15 in determining this angular relationship. The selector rack 16 has at its rear end a limit stop 17 for determining the ultimate degree of angularity of the gangs of disks.

The latch member 15 may be of any suitable or desirable construction, one form of which is illustrated in the copending application of Mitchell et al., Serial No. 77,974, filed May 5, 1936.

The disk harrow is also provided with a right turn mechanism including the connection 18 which extends forwardly and is connected to an offset arm or at offset position of the tractor with relation to the point of connection with the draft hitch with the harrow so that when a right turn is negotiated, a pull is imparted upon the connection 18 to release the latch means generally indicated at 19 with the result that the left-hand end of the front gang of disks is pulled forwardly out of angle to permit the harrow to make a right turn. The construction of this latch mechanism and the pulling of the disk harrow out of angle to negotiate a right turn in this manner forms no part of the present invention but is the subject matter of the copending application of Sjogren et al., Serial No. 14,000, filed April 1, 1935, and is fully set forth and described in the copending application of Mitchell et al., Serial No. 77,974, above referred to.

Mounted upon the hitch bar 8 is a tubular slide 20 which is mounted to slide longitudinally of the hitch bar 8 and is held in any one of its desired positions by means of hitch bar pin 21, which is adapted to fit in any one of a plurality of holes 22 spaced longitudinally in the bar 8. The pin 21 passes through slots 122 formed through the slide 20 and is retained in position by means of a washer 23 and cotter pin 24. This construction permits of limited rotation of the slide 20 upon the hitch bar 8 required as the harrow passes over uneven portions of ground, and there is a difference of relative elevation of the tractor and harrow. A tongue 25 is connected to the slide 20 having its rear end passed through a cylindrical boss 26 in the slide 20, and being secured in position by means of a collar 27 secured in position upon the tongue 25 by means of a bolt 28, the collar 27 and bolt 28 being mounted in an opening 29 in the slide 20. The forward end of the tongue 25 is formed to permit its connection with the tractor clevis being passed through the hole 30.

In the modified form of construction illustrated in Figure 3, similar parts have been designated with similar numerals with the addition of an exponent "a" thereto.

This modification of my invention differs principally from that heretofore set forth in the location of the angling bar 10ª. In this modification the angling bar 10ª is positioned at the right end of the harrow and operates in the reverse direction from that of the previous modification. The angling bar 10ª is connected to a fulcrumed lever 30ª, which fulcrumed lever is pivoted by a pivot 31ª to a bracket 32ª carried by the front frame. The fulcrumed lever 30ª is connected at its opposite end at a pivot 33ª with the free end of the hitch bar 8ª. Except as to this modification of construction and the consequent change in position of the slide and latch mechanism, the construction is substantially the same as that heretofore described in connection with the other modification of my invention. In this form of my construction the tongue 25ª is however rigidly connected with the slide 20ª and is held in rigid assembly by means of a brace 34ª.

The operation of the disk harrow embodying my invention, particularly as related to the hitch thereof, is that the slide 20 or 20ª may be located in any desired position along the hitch bars 8 or 8ª, the particular position selected will determine the degree of position of offset of the harrow with relation to the tractor.

The hitch assembly as thus defined is simple and permits the tractor to be close-coupled to the harrow and likewise permits the draft force of the tractor to be utilized for angling the gangs to their desired positions, and also for causing the gangs to be reversely angled when it is desired to make what is known as a "right turn".

Having fully described my invention, it is to be understood that I do not wish to be limited to the details of construction herein set forth as my invention is susceptible to various modifications without departing from the spirit thereof as defined in the appended claims.

I claim:

1. In a disk harrow, the combination of a front gang of disks and a rear gang of disks, means pivotally connecting the disk gangs to permit the same to swing to angular relation, a hitch bar pivotally connected to the forward gang of disks at one end, means connecting the opposite end of the hitch bar with the rear gang of disks whereby the swinging of the hitch bar upon its first mentioned pivot may be resorted to to control the angular relation of the gangs, a tongue, a slide connected to the tongue at its rear end, and means for releasably connecting the slide at selected points along the length of the hitch bar.

2. In combination with a disk harrow having a front disk gang, a hitch including a hitch bar adapted to be pivotally supported at one end directly to the front gang of disks and having its opposed end free, a slide mounted upon the hitch bar adapted to slide longitudinally thereof, and means for securing the slide in position of longitudinal adjustment of said hitch bar, and a draft tongue secured to said slide.

3. In combination with a disk harrow including a front gang of disks and a rear gang of disks, means for pivotally connecting the gangs of disks together, of a hitch bar adapted to be pivotally connected at its one end to the front gang of disks and adapted to be connected at its opposite end to the rear gang of disks, and a slide mounted to slide longitudinally of the hitch bar, and a draft tongue connected to the slide.

4. In combination with a disk harrow including a front gang of disks, a rear gang of disks, means for pivotally connecting the gangs of disks together, of a hitch including a hitch bar, means for pivotally connecting the hitch bar at one end to the front gange of disks, means for connecting the opposite end of the hitch bar with the rear gang of disks, a slide mounted to slide longitudinally of the hitch bar, means for securing the slide in position of adjustment along the length of the hitch bar, a draft tongue, and means for connecting the draft tongue with the slide to permit of relative rotation of the draft tongue and the slide.

5. In combination with a disk harrow including a front gang of disks, a rear gang of disks, means for pivotally connecting the gangs of disks together, of a hitch including a single hitch bar, means for pivotally connecting the hitch bar to the front gang of disks near one end thereof so as to permit the hitch bar to swing in a horizontal plane, means for connecting the opposite end of the hitch bar to the rear gang of disks, a slide mounted upon the hitch bar for adjustment along the length of the hitch bar, means for securing the slide in position of longitudinal adjustment of said hitch bar so as to permit of limited relative rotation of the slide around the hitch bar, and a draft tongue secured to the slide.

6. In combination with a disk harrow including a front gang of disks, a rear gang of disks, means for pivotally connecting the gangs of discs together, of a hitch including a transversely extending hitch bar, means for pivotally connecting the hitch bar at one end to the front gang of disks at one side end thereof to permit the hitch bar to swing in a horizontal plane, a fulcrum lever pivotally connected at one end to the other end of the hitch bar, a bracket secured to the front gang of disks to which bracket the fulcrum bar is fulcrumed, means for connecting the opposite end of the fulcrum bar with the rear gang of disks, a slide mounted upon the hitch bar for adjustment along the length of the hitch bar, means for securing the slide in adjusted position, and a draft tongue connected to the slide and extending forwardly therefrom in the direction of the line of progress of the harrow.

7. In combination with a disk harrow including a front gang of disks, a rear gang of disks, means for pivotally connecting the gangs of disks together, of a hitch including a transversely extending hitch bar, means for pivotally connecting the hitch bar at one end to the front gang of disks at one side end thereof to permit the hitch bar to swing in a horizontal plane, a fulcrum lever pivotally connected at one end to the other end of the hitch bar, a bracket secured to the front gang of disks to which bracket the fulcrum bar is fulcrumed, means for connecting the opposite end of the fulcrum bar with the rear gang of disks, a slide mounted upon the hitch bar for adjustment along the length of the hitch bar, means for securing the slide in adjusted position, a draft tongue connected to the slide and extending forwardly therefrom in the direction of the line of progress of the harrow, and an adjustable brace rod connected between the draft hitch and the hitch bar adjustable at one end along the length of the hitch bar to correspond with the position of adjustment of the slide.

8. In a disk harrow, the combination of a front gang of disks, a rear gang of disks, means pivotally connecting said gangs of disks together to permit the gangs to swing to angled relation, a transversely extending hitch bar pivotally connected to said front gang of disks near one end thereof, means connecting the hitch bar at a point spaced from said pivotal connection with said rear gang of disks, a generally longitudinally extending draft tongue, and means connecting said tongue to said hitch bar, said connecting means permitting said vertical swinging movement of said tongue relative to said hitch bar but preventing relative horizontal swinging movement therebetween.

9. In a disk harrow, the combination of a front gang of disks, a rear gang of disks, means pivotally connecting said gangs together to permit the same to swing to angled relation in a horizontal plane, a transversely extending hitch bar pivotally connected to said front disk gang, means connecting the hitch bar at a point spaced from said pivotal connection with said rear gang of disks, a generally longitudinally extending draft tongue, and means connecting said tongue to said hitch bar, said connecting means permitting swiveling and vertical swinging movements of said tongue relative to said hitch bar, but preventing horizontal angular movement therebetween.

10. In a disk harrow, the combination of a front gang of disks, and a rear gang of disks, means pivotally connecting the disk gangs together to permit the same to swing to angular relation, a hitch bar pivotally connected at one end to the forward disk gang, a fulcrumed lever pivotally mounted upon the front disk gang, means for pivotally connecting the hitch bar with the fulcrumed lever, means connecting the fulcrumed lever with the rear disk gang, and a generally longitudinally extending tongue connected with the hitch bar.

11. In a disk harrow, the combination of a front gang of disks, and a rear gang of disks, means pivotally connecting the disk gangs to permit the same to swing to angular relation, a hitch bar pivotally connected to the front gang of disks, a lever pivotally fulcrumed upon the front disk gang and having one end pivotally connected with the hitch bar, means pivotally connecting its opposite end with the rear disk gang on the same side of the pivotal connection between said gang as the pivotal connection of the hitch bar, a generally longitudinally extending tongue, and means whereby the generally longitudinally extending tongue may be secured in selected position along the length of the hitch bar so as to maintain a vertically rigid connection between said tongue and said hitch bar.

ROLLIE H. MITCHELL.